United States Patent [19]

Nakano et al.

[11] 3,875,333

[45] Apr. 1, 1975

[54] METHOD OF ELIMINATING ERRORS OF DISCRIMINATION DUE TO INTERSYMBOL INTERFERENCE AND A DEVICE FOR USING THE METHOD

[75] Inventors: Toshio Nakano, Kodaira; Yasushi Kudo, Kamakura, both of Japan

[73] Assignees: Hitachi, Ltd.; Nippon Telegraph and Telephone Public Corporation, Tokyo, Japan

[22] Filed: Oct. 6, 1972

[21] Appl. No.: 295,654

[30] Foreign Application Priority Data

Oct. 8, 1971 Japan .............................. 46-78648

[52] U.S. Cl. .................... 178/88, 325/323, 325/473, 328/167

[51] Int. Cl. ........................................... H04b 15/00

[58] Field of Search ....... 325/41, 42, 321, 473, 323; 178/69, 68, 88; 328/155, 165, 167

[56] References Cited

UNITED STATES PATENTS

| | | | |
|---|---|---|---|
| 3,072,855 | 1/1963 | Chandler | 325/42 |
| 3,274,582 | 9/1966 | Gibson | 325/42 |
| 3,524,169 | 8/1970 | McAuliffe et al. | 325/42 |
| 3,614,623 | 10/1971 | McAuliffe | 325/42 |
| 3,646,480 | 2/1972 | Spaulding | 328/167 |

*Primary Examiner*—Benedict V. Safourek
*Assistant Examiner*—Jin F. Ng
*Attorney, Agent, or Firm*—Craig & Antonelli

[57] ABSTRACT

A method of eliminating errors of discrimination due to intersymbol interferance by discriminating an input signal with respect to a first predetermined threshold value thereby to produce a train of pulses in accordance with the results of the discrimination, digitally delaying the train of pulses, producing a first analog signal which is similar to the input signal from the train of pulses, analogically delaying the input signal, comparing the analogically delayed input signal with the first analog signal to produce a difference signal with respect to a second predetermined threshold value to produce a pulse signal in accordance with the result of the last-mentioned discrimination, and digitally adding or half adding the pulse signal to the digitally delayed train of pulses to provide a corrected train of pulses thereby reducing the rate of errors of discrimination due to intersymbol interference. The method also includes the producing of a second analog signal from the pulse signal obtained by the last-mentioned discrimination, analogically delaying the difference signal, and comparing the analogically delayed difference signal with the second analog signal to provide an output signal indicative of the discrimination error rate, and a device for using the method.

15 Claims, 23 Drawing Figures

METHOD OF ELIMINATING ERRORS OF DISCRIMINATION DUE TO INTERSYMBOL INTERFERENCE AND A DEVICE FOR USING THE METHOD

The present invention relates to a method of eliminating errors of discrimination due to intersymbol interference in digital pulse transmission, and a device for using the method.

One of the most important problems to be solved in the radio PCM transmission is how to minimize errors of discrimination which occur at the time of detection due to the superimposition of atmospheric, space and municipal noises upon the transmitted signals.

The magnitude of these noises varies with the weather conditions, seasons and time at a certain rate or quite at random, while the level of the received signals is subject to continuous change due to fading, scattering and absorption, resulting in, correspondingly, the change of the rate of errors of discrimination in the transmission system.

Apart from the errors due to these natural phenomena, it is required in the radio PCM transmission that the frequency band occupied by one channel be as narrow as possible. This is quite important to make the efficient utilization of the limited range of frequencies, but the trouble is that the limitation of a frequency band may cause intersymbol interference. The intersymbol interference results in as great a probability of an increased amplitude of a signal as that of a reduced amplitude thereof. The reduced amplitude of the signal lessens the noise margin for detection, leading to a much larger rate of errors of discrimination and therefore posing a serious problem to the transmission system.

In order to secure the reliablity of the radio PCM transmission line, therefore, it is most important to eliminate the errors of discrimination by removing the effects of the intersymbol interference and to monitor the discrimination errors in the in-service system.

Accordingly, it is an object of the present invention to provide a method of eliminating errors of discrimination due to intersymbol interference in which any error of discrimination of a received signal, which may occur when the signal is involved intersymbol interference is detected; the detected error is applied to a means for counting the errors for a unit time in order to measure the error rate; and the detected errors are digitally corrected; said method comprising a first step of primary identification or discrimination of the received signal, a second step of storing the results of the primary discrimination in a shift register with a plurality of stages, a third step of applying the results of the primary discrimination through a network with a transmission characteristic substantially the same as that of a transmission and reception system (hereinafter called "the transmission line equivalent circuit") thereby to reproduce a waveform of a signal in those time slots except the ones involving the errors of discrimination which is equivalent to the waveform of the received signal, a fourth step of comparing the reproduced signal with the delayed received signal, a fifth step of detecting errors by secondary discrimination of the results of the comparison, a sixth stem of generating a pulse corresponding to the detected errors, a seventh step of correcting digitally the error of the results of the primary identification on the basis of the detected errors, and a eighth step of applying to a counting circuit the pulses generated in response to the detected errors thereby to measure and monitor the error rate.

Another object of the present invention is to provide a device for using the abovementioned method.

The above and other objects, features and advantages will be made apparent by the detailed description taken in conjunction with the accompanying drawings, in which.

Figure 1:
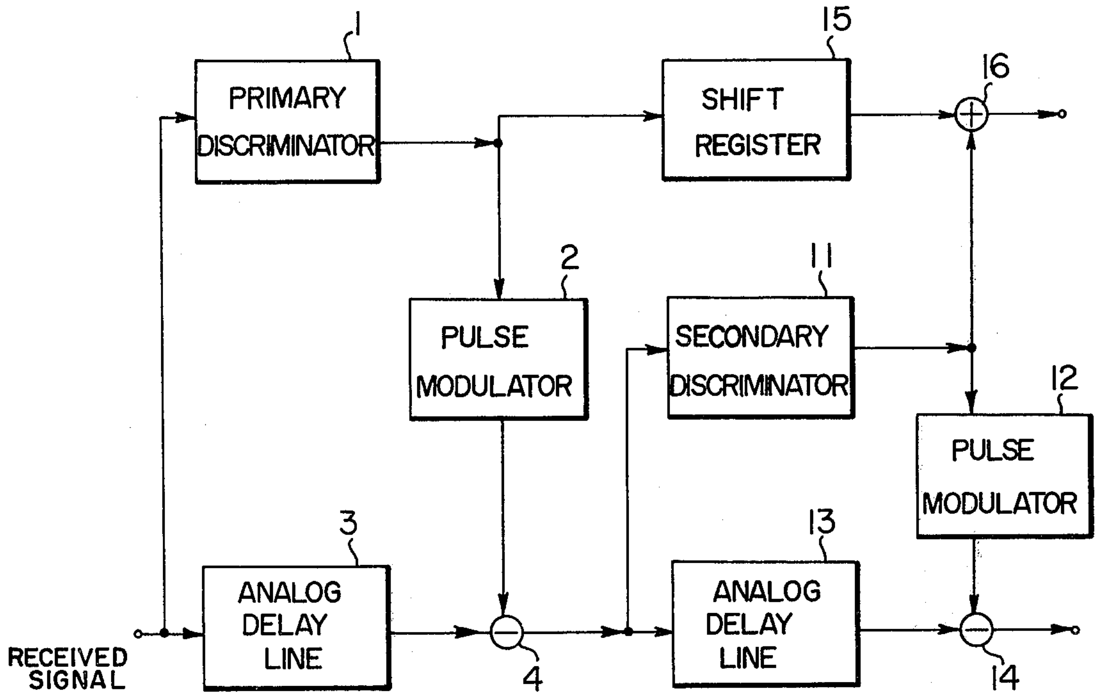
FIG. 1 is a schematic block diagram showing the system according to the present invention.
Figures 3A, 3B:
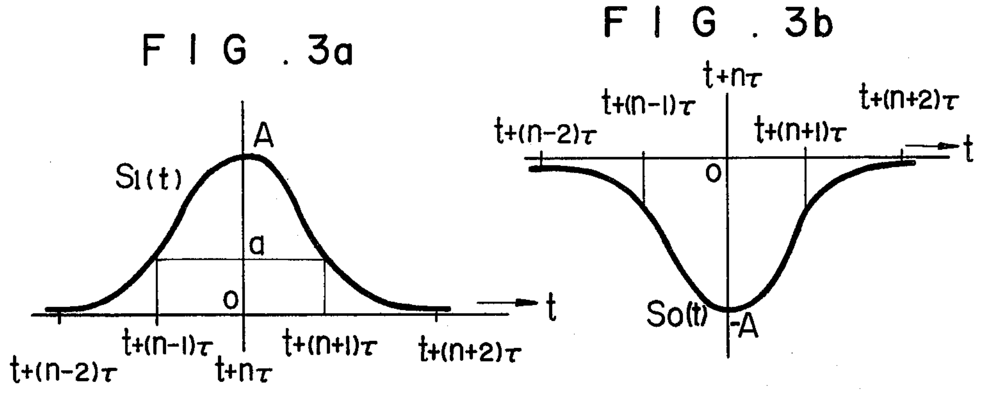
Figure 4:
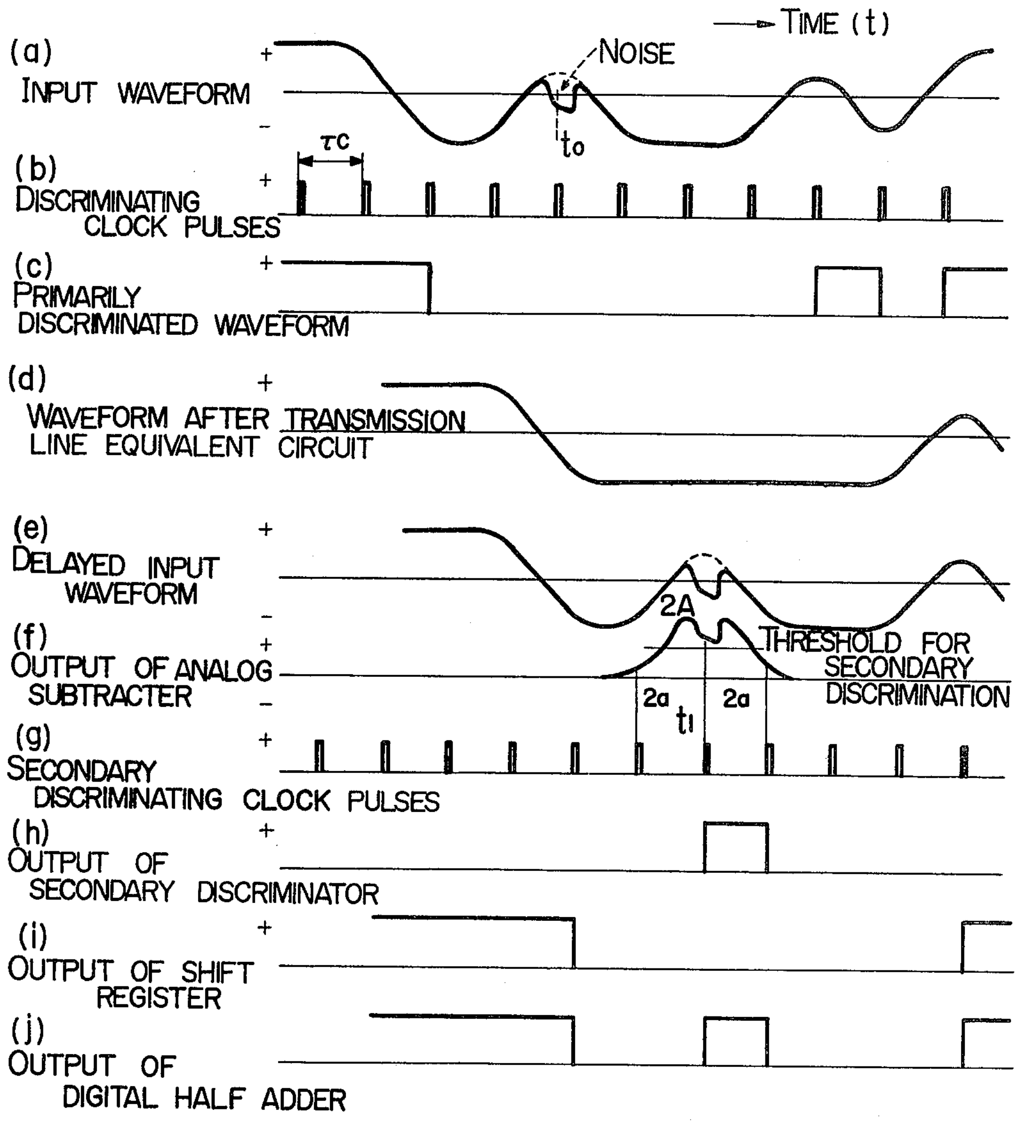
Figure 5:
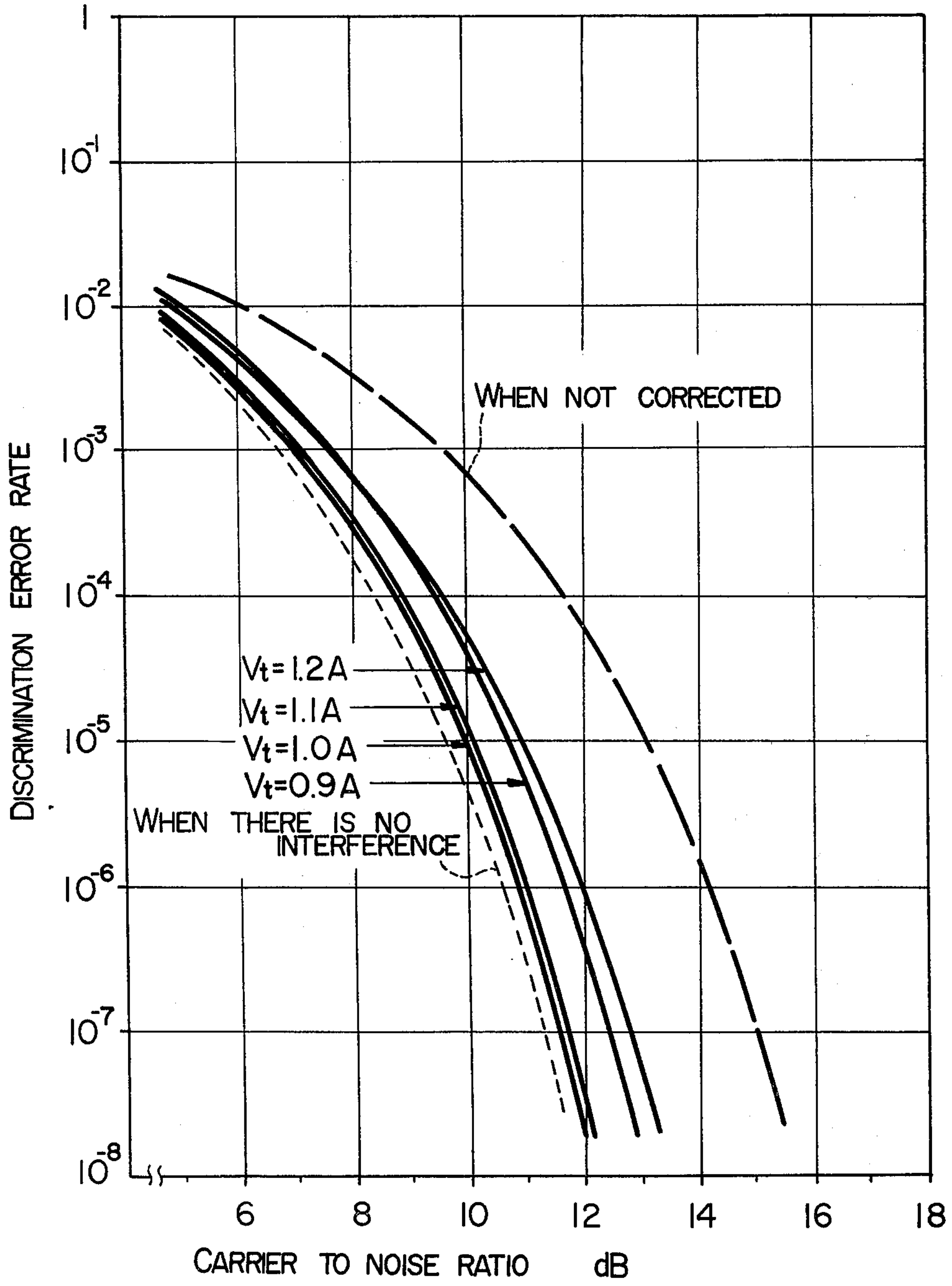
Figure 6:
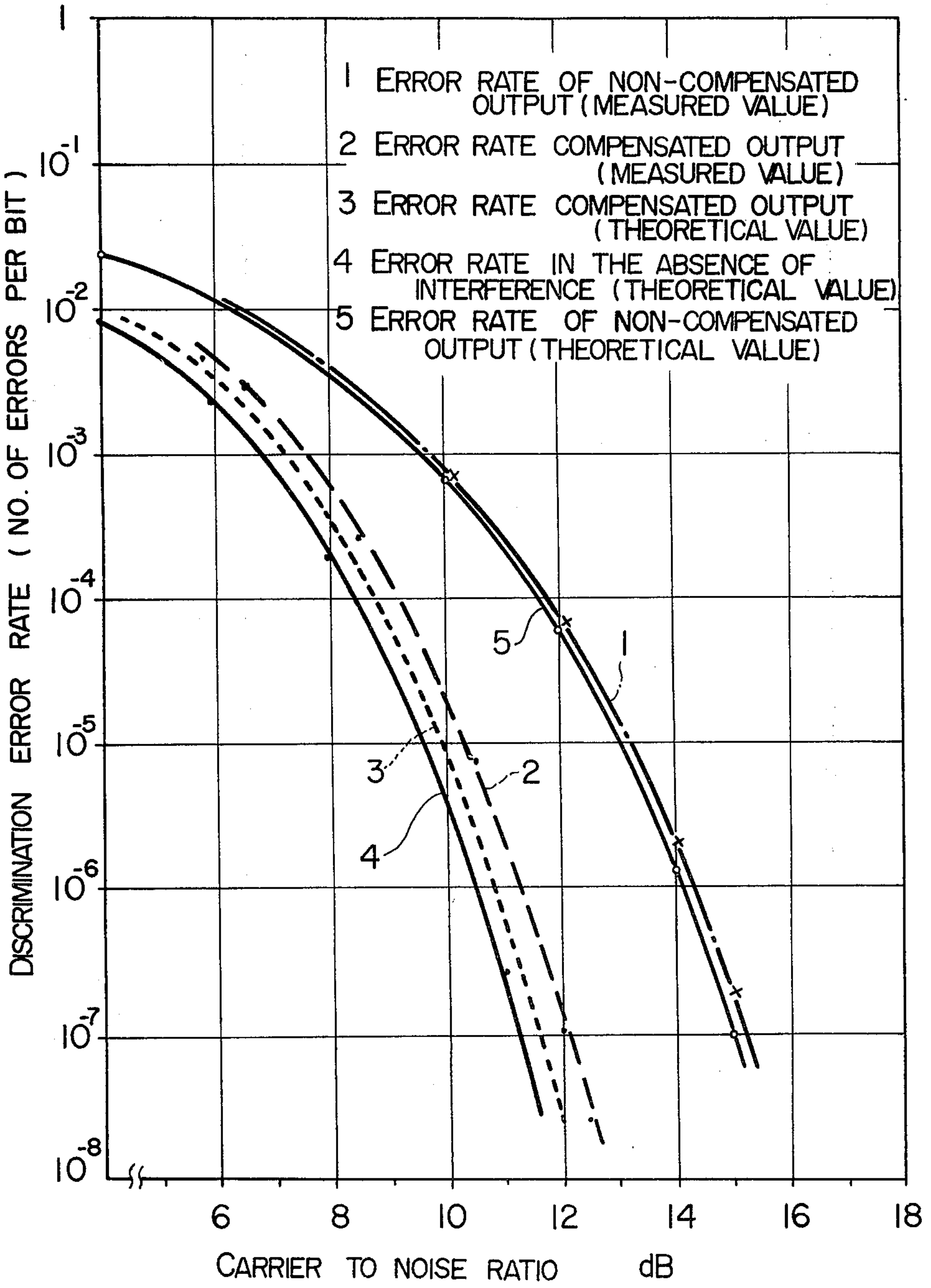
Figure 7A:
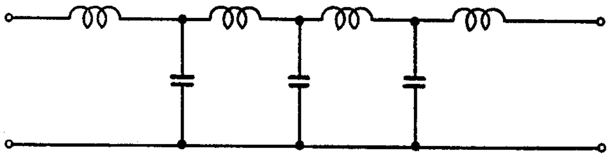
Figure 7B:
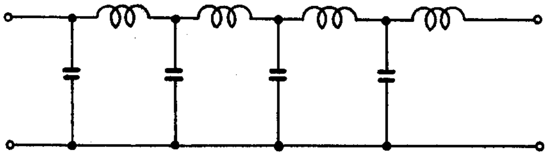
Figure 7C:
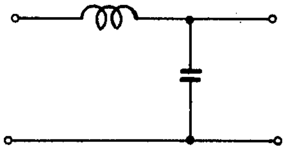
Figure 7D:
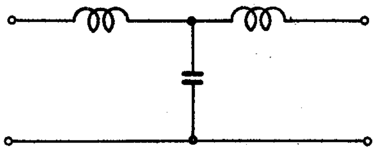
Figure 7E:
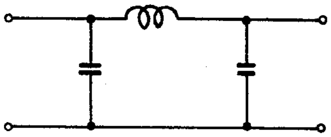
Figure 7F:
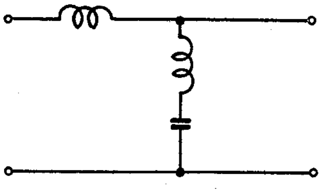
Figure 7G:
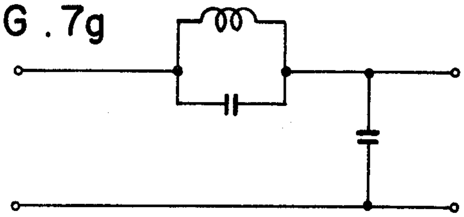
Figure 7H:
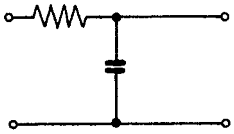
Figure 7I:
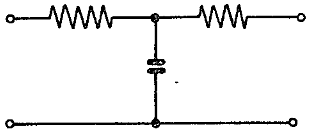
Figure 7J:
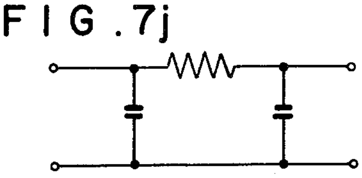
Figure 7K:
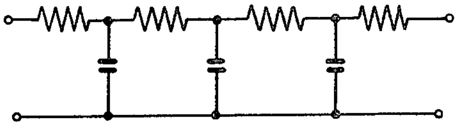

FIGS. 3*a* and 3*b* are waveform diagrams showing the relation between the signal in a time slot and the intersymbol interference occurring in another time slot;

FIGS. 4 is a diagram showing waveforms produced at the input and output terminals of each block of FIG. 1 in one embodiment of the present invention;

FIG. 5 is a diagram showing an example of the numerical value of the error rate of discrimination;

FIG. 6 is a diagram showing an example of the measured error rate of discrimination.

Figure 10:
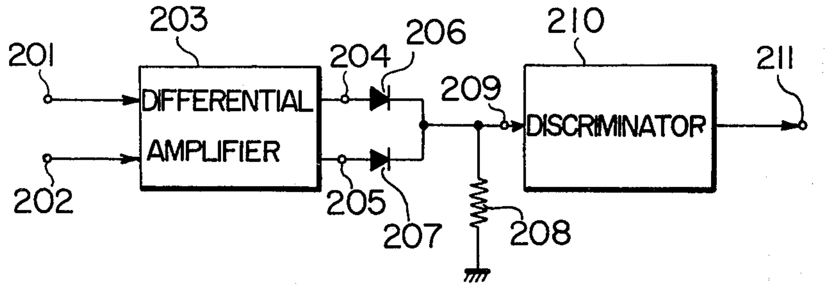
Figure 11:
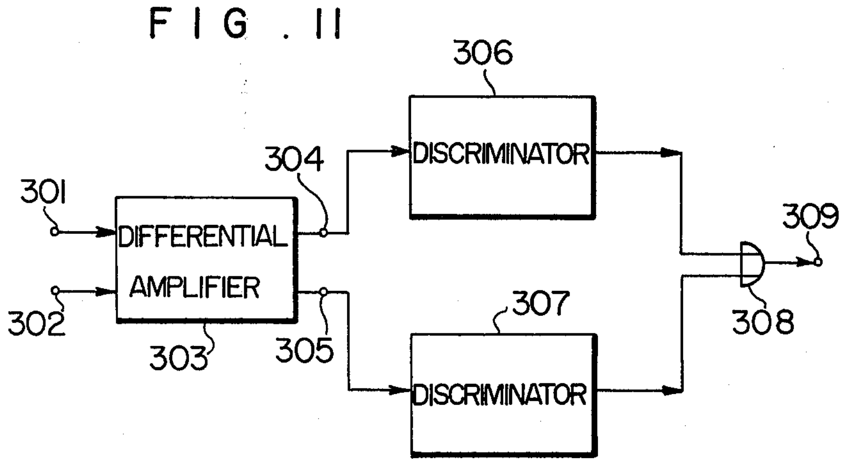
Figure 8:
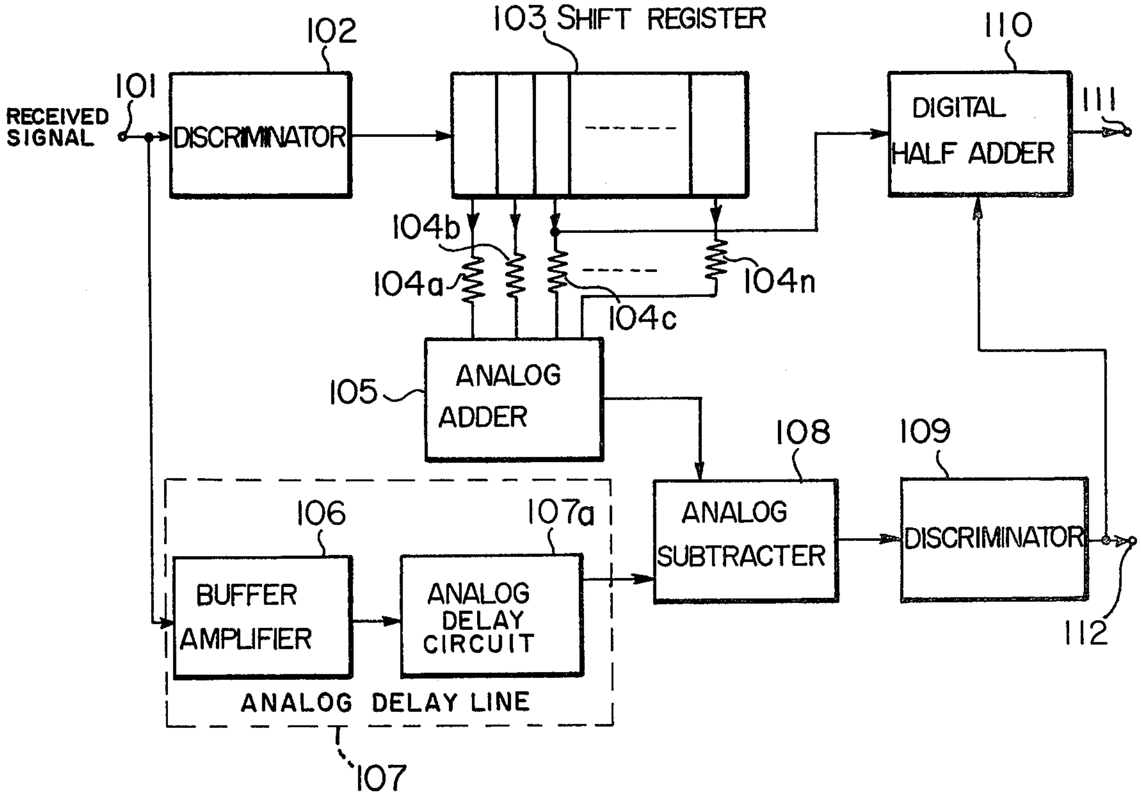
Figure 9:
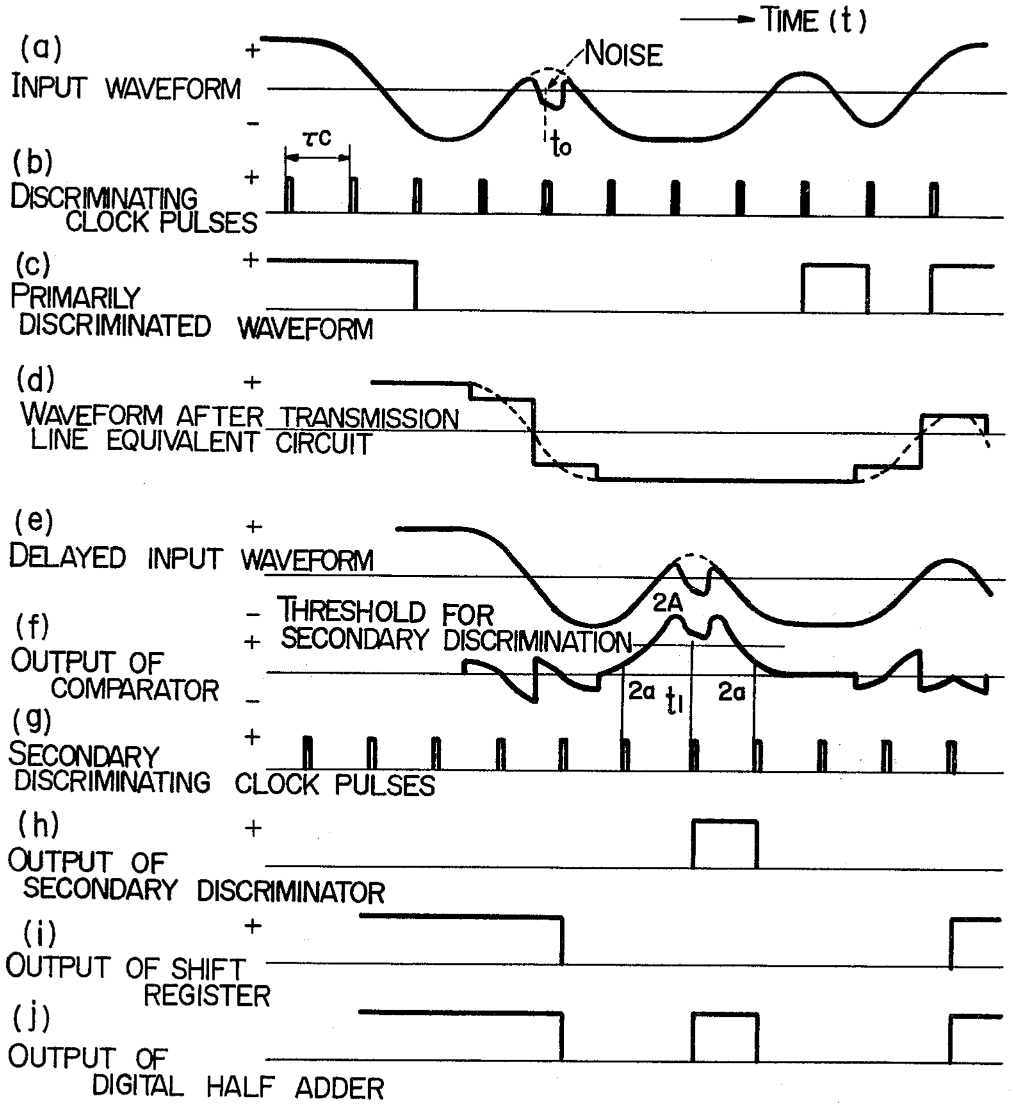
Figure 12:
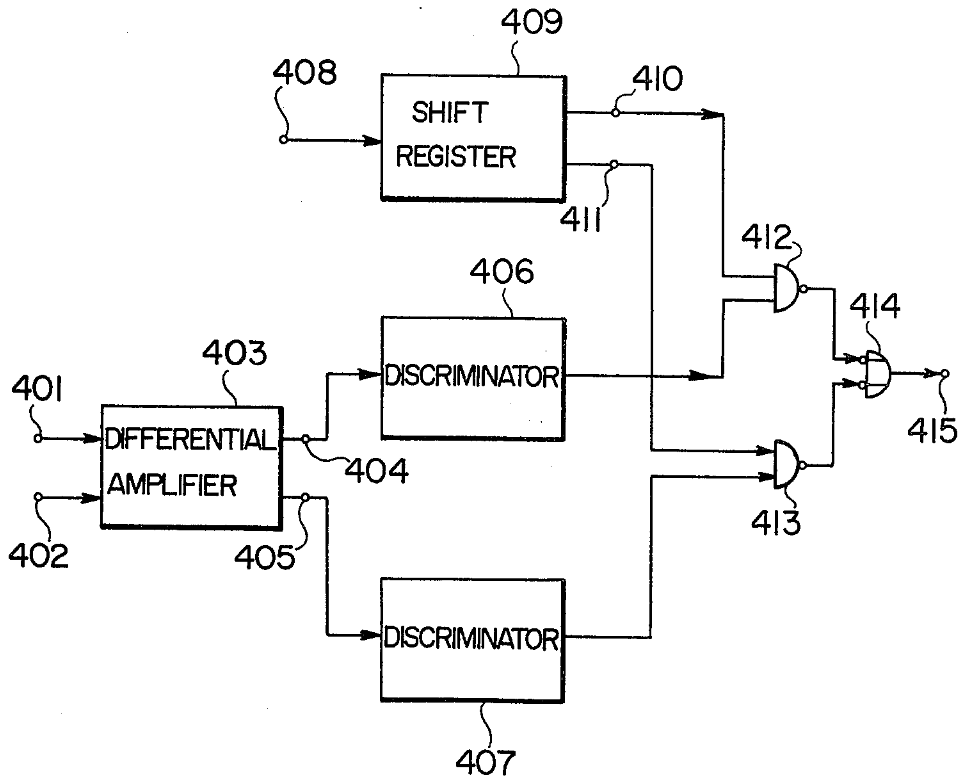

FIGS. 7*a* to 7*k* are diagrams showing filters used as the transmission line equivalent circuit;

FIG. 8 is a diagram showing a method of comparing the received signal with a signal which is result of producing a pulse train by the primary discrimination, applying the pulse train to a multi-stage shift register, weighting the outputs of each stage of the register and summing up the weighted values analogically;

FIG. 9 is a diagram showing the waveforms produced from each part of the embodiment shown in FIG. 8; and FIGS. 10, 11 and 12 are diagrams showing an embodiment of an analogical substraction and secondary discrimination system employed in a circuit for erasing the unrequired pulses among those pulses generated as the result of the secondary discrimination.

It is well known that the digital pulse communications involve the transmission and detection at a receiving end of a signal waveform represented by $S(t+n\tau)$, where $t$ is time, $n$ the time slot number in the form of an integer ranging from $-\infty$ to $+\infty$, and $\tau$ the time interval between adjacent time slots. Signal $S(t)$ includes waveforms in the number of $m+1$, i.e., $S_o(t), \ldots S_m(t)$ and among them those which have reached the receiving end are discriminated. Here, $S_i(t) \neq S_j(t)$ $(i \neq j)$ and it is assumed that $S_o(t) \equiv 0$ without affecting the generality of the signal.

It is usual that the frequency band of a signal waveform is limited depending on the state of a transmission line, and therefore it is inevitable that $S_i(t)$ $(i \neq o)$ except $S_o(t) \equiv 0$ accompanied by a certain undesirable expansion of time which affects adjacent or even farther time slots. This phenomenon is called an intersymbol interference and poses a serious problem in pulse transmission.

The code discriminator used for detection of a signal waveform at the receiving end, as is well known, has a threshold with which the input signal is compared for code discrimination. The intersymbol interference reduces the noise margin with respect to the threshold, resulting in increasing of errors in the code discrimination. This probability or error is called the discrimination error rate and represented by $\eta$. The discrimination error rate $\eta$ naturally depends on not only the characteristics of the code discriminator but also the waveform and the distribution of the probability of generation of the signal.

It is now assumed that signals $$S_i(t+n\tau) + S_j\{t + (n+1)\tau\} + S_k\{t + (n+2)\tau\} + S_l\{t + (n+3)\tau\} + S_m\{t + (n+4)\tau\}+ \quad (1)$$

corresponding to a given pulse train is transmitted from a transmitter, and that a discrimination error occurred at the time point $t+(n+2)\tau$ so that it was decided that $S_k\{t+(n+2)\tau\}$ equals $S_n\{t+(n+2)\tau\}$. Then the signals corresponding to the output of the discriminator are expressed as $$S_i(t+n\tau)+S_j\{t+(n+1)\tau\}+S_n\{t+(n+2)\tau\}+ S_l\{t+(n+3)\tau\}+S_m\{t+(n+4)\tau\}+ \quad (2)$$

The difference between the signals (1) and (2) is given by $$S_k\{t + (n+2)\tau\} - S_n\{t + (n+2)\tau\} \quad (3)$$

which are the only signals that remain unextinguished.

The method according to the present invention is based upon the above-mentioned facts and is intended to eliminate the intersymbol interference through the processes of primary discrimination that is, discrimination of an input signal waveform, comparing the result of the primary discrimination with the delayed input signal waveform, the secondary discrimination of time series of signal proportional to the difference obtained as the result of the preceding comparison and correcting the result of the primary discrimination on the basis of the result of the secondary discrimination.

The principle of operation according to the present invention will be now explained with reference to FIG. 1. In this figure, the reference numeral 1 shows a primary discriminator comprising a combination of a differential amplifier and a flip-flop and discriminable with respect to a predetermined threshold voltage, for example, a zero voltage, numeral 2 a pulse modulator constituting a transmission line equivalent circuit, numeral 3 an analog delay line of the ladder type including a drive circuit, numeral 4 an analog subtractor circuit or comparator comprising a differential amplifier, numeral 11 a secondary discriminator comprising a combination of a differential amplifier and a flip-flop, numeral 12 a pulse modulator constituting a transmission line equivalent circuit, numeral 13 an analog delay line of the ladder type, numeral 14 an analog subtractor or comparator comprising a differential amplifier, numeral 15 a shift register, and numeral 16 a digital adder circuit which is a half adder comprising 4 NAND gates.

The transmission line equivalent circuit used for the pulse modulator 12 is a network with substantially the same transmission characteristics as those of a transmission and receiving system and includes, for example, a low-pass filter of the Thomson type comprising lumped L and C when the transmission system involved has the characteristic of the Thomson type low pass filtration. Such a low pass filter used as a transmission line equivalent circuit may take various types including the well-known ladder type, L type, T type and $\pi$ type as shown in FIGS. 7*a* to 7*k*.

Digital information $i$ is applied to the pulse modulator 2 which generates the signal waveform $S_i(t)$ corresponding to the result $i$ of the primary discrimination and having an amplitude adjusted to a level corresponding to the amplitude of the received waveform for application to the subtractor 4. That is, if the input signal waveform does not include any noise which changes the waveform from its original shape to a substantial extent and the primary discriminator operates correctly, the primary discriminator produces digital information $i$ in response to an input signal having the waveform $S_i(t)$. On the other hand, the waveform as shown in FIG. 4(*a*) is delayed an appropriate time through the analog delay line 3 so that the delayed input waveform of FIG. 4(*e*) is substantially in phase with the output waveform of FIG. 4(*d*) of the pulse modulator 2 and then the delayed input waveform of FIG. 4(*e*) and the output waveform of FIG. 4(*d*) are applied to the subtractor 4 thereby to produce a waveform of FIG. 4(*f*) corresponding to the difference between them.

Assuming that the actual input waveform is $S_j(t)$ and includes noise causing substantial change in the waveform such that the primary discriminator provides digital information $i$ in response to an input signal having the waveform $S_j(t)$. Hence the output of the analog subtractor 4 is expressed as $S_j(t) - S_i(t)$. If the result of the primary discrimination is correct, $i = j$ and $S_j(t) - S_i(t) \equiv 0$.

The output of the analog subractor 4 goes through the secondary discrimination in the code discriminator 11 and forms digital information or the result of secondary discrimination in the form of $j - i$ corresponding to $S_j(t) - S_i(t)$.

On the other hand, the result of the primary discrimination $i$ is delayed through the shift register 15 so that the delayed result of the primary discrimination $i$ corresponding to a given clock pulse $t_0$ appears simultaneously with the result of the secondary discrimination $j-i$ corresponding to the same clock pulse and then the delayed result of the primary discrimination $i$ is digitally added to the result of secondary discrimination $j - i$ in the digital adder 16 thus correcting the error as shown by the equation $i + (j - i) = j$. The result of secondary discrimination $j - i$ is applied to the pulse modulator 12 which produces the waveform $S_j(t) - S_i(t)$. This is applied to the analog subtractor 14 where it is differentially added to i.e., added to form a difference signal with the output of the analog subtractor 4 which has passed through the delay line 13. Assuming that the result of secondary discrimination still contains some errors and is expressed as $j'-i$, the result of correction of the digital information is $j'$ and the output of the analog subractor 14 is given by $S_j(t) - S_j'(t)$.

The rate at which the above-mentioned signal appears at the output terminal of the analog subtractor 14 in a unit time is equal to the discrimination error rate which occurs when the result of the primary discrimination is corrected in accordance with the result of the secondary discrimination. This is due to the fact that if there is any error in the result of the secondary discrimination, the result of the primary discrimination is "erroneously" corrected or fails to be corrected.

Detailed explanation will be made now of the effect and operation of the present invention with reference to the case in which the present invention is applied to a system employing two types of signal, i.e., $S_1(t)$ and $S_0(t)$ having the waveforms as shown in FIGS. 3*a* and 3b respectively. As shown in the figures, assume that the amplitude of the signal in a given time slot is A, and *a* in an adjacent time slot with interference, while the interference present in a time slot distant by 2 bits or more is negligibly small.

It is also assumed, by way of explanation, that a waveform as shown in FIG. 4(*a*) has arrived. In a time slot shown by $t_0$ in the drawing, a noise is superimposed on the signal, with the result that the signal takes a negative form which otherwise might be positive. This waveform is discriminated in the discriminator 1 with the aid of the clock pulses as shown in FIG. 4(*b*) so that the discriminator 1 produces an output in the form of a train of pulses shown in FIG. 4(*c*) as the result of the primary discrimination and it is decided that the signal of the waveform shown in FIG. 4(*a*) is negative at the time point $t_o$. When the signal with the waveform of FIG. 4(*c*) is applied through the transmission line equivalent circuit 2, both a time delay and an intersymbol interference occur, and the transmission line equivalent circuit 2 produces an output shown in FIG. 4(*d*). On the other hand, when the input signal waveform shown in FIG. 4(*a*) is delayed by the analog delay line, the signal of waveform shown in FIG. 4(*e*) is obtained. The time delay in this case, however, must be made equal to the time of transmission delay in the discriminator and the transmission line equivalent circuit. The analog subtractor 4 produces the waveform shown in FIG. 4(*f*) upon the application thereto the waveforms of FIGS. 4(*d*) and 4(*e* ). The amplitude of this waveform at the time point $t_1$ is greater, the smaller the instantaneous amplitude of a noise causing an error in the primary discrimination. Therefore, by discriminating secondarily the waveform of FIG. 4(*f*) with reference to an appropriate threshold value by means of the clock pulses shown in FIG. 4(*g*), pulses in the waveform of FIG. 4(*h*) corresponding to the error in the primary discrimination are produced from the secondary discriminator. The waveform of FIG. 4(*j*) is produced as a result of half addition of the result of secondary discrimination, i.e., the waveform of FIG. 4(*h*) to the waveform of FIG. 4(*i*) by means of the digital adder. As a result, the signal which has disappeared during the primary discrimination due to the superimposition of a noise on the input waveform at time point $t_o$ is reproduced.

Explanation will be now made of the quantitative relationship between the amplitude of signal, average noise power and discrimination error rate. The amplitude of the input of the primary discriminator takes one of the six values, that is, $\pm A$, $\pm(A+2a)$ and $\pm(A-2a)$ derived from the combination of the codes $S_0(t)$ or $S_1(t)$ of the three bits adjacent to the time slot under consideration. For convenience of explanation, the codes $S_0(t)$ and $S_1(t)$ will be expressed as L and H respectively hereafter. Since it is considered that L and H occur at the same rate in a transmitted signal, the probability of the above-mentioned amplitude occurring at the input terminal is given by $$P\{A\} = P\{-A\} = 1/4$$

$$P\{A+2a\} = P\{-(A+2a)\} = P\{A-2a\} = P\{-(A-2a)\} = 1/8$$

Assume now that the codes of three bits succeeding and preceding to the time slot under consideration are H, H and H. If an error occurs in the primary discrimination, the primary discriminator produces outputs H, L and H. The amplitude in the central time slot which is subjected to an intersymbol interference at the input terminal is $A+2a$ in the case of H, H and H, $-A+2a$ in the case of H, L and H, and therefore if a noise with the amplitude $V_n$ is superimposed upon the input signal, the output $V_o$ of the analog subtractor 4 is $$V_o = \{(A+2a)-V_n\} - (-A+2a) = 2A - V_n$$

For every combination of the codes of the successive three bits, the absolute value of the output of the analog subtractor 4 associated with the time slot involving an error is $|2A-V_n|$.

It is assumed that an emitter-coupled differential amplifier comprising two transistors is used as a comparator provided in the secondary discriminator 11 in which the output of the analog subtractor 4 is applied to a base thereof and the output of the transmission line equivalent circuit used for the pulse modulator 2 is applied to the other base thereof. A voltage proportional to $+|2A-V_n|$ appears at one of the collectors.

Also, assuming that a noise voltage is given by $A-2a < V_n < A$, the primary discriminator makes an error, deciding that a signal with the amplitude of $-(A-2a)$ on which the noise is superimposed is positive. Under this condition, the output $V_o$ of the subtractor is defined as $A < V_o < A+2a$ When this output $V_o$ is identified by the secondary discriminator with the threshold voltage $V_t$ ($V_t$ being required to be in the range $A < V_t < A+2a$), the secondary discriminator produces a pulse as shown in FIG. 4(*h*). This error made by the primary discriminator is corrected by the above-mentioned means, while at the same time the number of pulses delivered by the secondary discriminator is counted by a pulse counter with an appropriate gating time, thereby making it possible to directly measure the discrimination error rate of the primary discrimination.

Explanation will be made of the results of calculation of the errors of discrimination thus corrected, assuming that 1. The noise is a white one. The distribution of probability density of noise amplitude $Vn$ occurring is given by $$Pn(Vn) = \frac{1}{\sqrt{2\pi\sigma}} e^{-\frac{V_n^2}{2\sigma^2}}$$

where $\sigma$ is an average noise power.

2. The discriminator has no indeterminate zone, in which correct discrimination is not assured, around the threshold.
3. The transmission characteristics of the transmission line equivalent circuit is the same as that of the transmission and receiving system.
4. The probability of making an error for successive two bits in the primary discrimination is negligibly small.
5. The probability of occurrence of L is the same as that of H.

Under these assumptions, the error rate of primary detection is calculated by the summation of the probabilities of incorrect determination of the six signal amplitudes $\pm(A+2a)$, $\pm A$ and $\pm(A-2a)$, weighted with the probability of occurrence of these six amplitudes. Then an uncorrected coding error Po is determined. In like manner, the probability Pc of producing a pulse from the secondary discriminator is calculated as follows after the laborious manipulation;

$$Pe=\left[\frac{1}{4}\int_{-\infty}^{-(2A+V_t)}+\frac{1}{2}\int_{(-A+2a)}^{-A}+\frac{3}{4}\int_{-\infty}^{(A+2a)}+Po\left\{\int_{-\infty}^{-(V_t+2a)}+\int_{V_t-2a}^{\infty}\right\}+\frac{1}{4}\int_{V_t}^{A+2a}\right]PndV_n$$

An example of calculating the discrimination error rate is shown in FIG. 5. In this figure, not only Pe but the uncorrected error rate P*o* and the error rate P in the absence of interference, i.e., when the amplitude of a signal for any time slot is +A or −A, are plotted for convenience of comparison.

The superiority of the above-mentioned method or device of eliminating errors of discrimination due to intersymbol interference has been confirmed by experiments. Referring to FIG. 6 showing the result of measurement of Pe, the intersymbol interference *a*/A is about 0.19. The experiments have been conducted by the use of a low-speed digital signal with a pulse rate of 900 kilobits per second, and a low-pass filter was used as the transmission line equivalent circuit. The carrrier to noise ratio has been improved by 3 dB.

Another embodiment of the present invention will be now explained with reference to the block diagram of FIG. 8. This embodiment is different from the preceding one in that in the present embodiment no transmission line equivalent circuit is employed but a signal to be compared with a received signal is produced by combining the outputs of each stage of a shift register.

The operation of the present embodiment of the invention will be now explained with reference to FIG. 8.

A received signal which has arrived at the input terminal 101 is primarily discriminated by the discriminator 102 and, after being converted into a digital signal, applied to the shift register 103. On the other hand, part of the received signal is applied to the analog subtractor circuit 108 through an analog delay line 107 having a buffer amplifier circuit 106 and an analog delay circuit **107*a***. The above-mentioned processes are quite identical with those in the preceding embodiment.

The shift register 103 comprises a plurality of flip-flops in cascade so as to enable digital delay by 2 bits or more, and each stage of the flip-flops is capable of producing outputs including a "not" output. The output of each flip-flop is weighted by the weighting circuits **104*a* to 104*n* and added to each other by the analog adder circuit 105. The output of the adder circuit 105 is introduced to the analog subtractor 108 for the subtracting operation of the delayed received signal. In the subsequent processes which are the same as those in the preceding embodiment, the output of the analog subtractor 108 is secondarily discriminated by the discriminator 109 which produces a pulse in accordance with the results of the secondary discrimination. The produced pulse is added to an output of the shift register 103 by the digital half adder 110 thereby to correct the error in the primary discrimination. The corrected signal appears at the terminal 111. Further, pulses corresponding to the error in the secondary discrimination which are obtained at the terminal 112** are counted by the pulse counter operating at a predetermined gating time thereby to measure the discrimination error rate.

Assuming that a signal component of the time slot under consideration at the time of discrimination is S(to) and the interference caused by a signal of a time slot numbered *j* from the time slot under consideration is I*j*, the entire amplitude of the time slot under consideration is expressed as $$S=S(t_o)+\sum_{j=-\infty}^{+\infty} IjIj$$

This equation is given as a sum, as described below, of satisfactorily approximate finite series.

$$S'=S(t_o)+\sum_{j=-n'}^{n} Ij(j+o)$$

where *n* and *n'* are given positive integral numbers.

In this case, the number of flip-flops required for the shift register 103 is 2*n* + 1. If the digital delay output is taken from the central flip-flop, the weighting coefficient of the weighting circuit associated with the flip-flop numbered the j from the central flip-flop may be given as $$\alpha j=\frac{Ij}{S(t_o)}$$

Examples of waveforms produced at the input and output terminals of each block in the present embodiment are shown in FIGS. 9(*a*) to 9(*j*), FIG. 9(*a*) illustrating the waveform of a received signal. A digital signal as shown in FIG. 9(*c*) is obtained by the primary discrimination of the waveform of FIG. 9(*a*) by means of the clock pulses shown in FIG. 9(*b*). The waveform of FIG. 9(*c*) is applied to the shift register and the outputs of each flip-flop are weighted and added, resulting in the waveform of FIG. 9(*d*). The difference between waveform of FIG. 9(*d*) and the delayed waveform shown in FIG. 9(*e*) is determined by the analog subtractor 8, which produces an output as shown in FIG. 9(*f*). This output of the analog subtractor never becomes zero except at the points of the discriminating clock pulses even when no error occurs, because the waveform of FIG. 9(*d*) takes the form of steps. But this has no practical disadvantage. The processes from the waveform of FIG. 9(*g*) to that of FIG. 9(*j*) are the same as those in the preceding embodiment.

In the above-described two embodiments of the present invention, the combination of the analog adder or subtractor means for comparing two signals, the means for secondary discrimination of the result of subtraction and the means for applying to the digital half adder the pulse generated in accordance with the result of secondary discrimination may take the three forms as shown in FIGS. 10, 11 and 12 respectively.

Referring to FIG. 10, the reference numeral 203 shows a differential amplifier, numerals 201 and 202 input terminals, numerals 204 and 205 output terminals, numerals 206 and 207 diodes, numeral 208 a load resistor, numeral 209 an input terminal of the discriminator, numeral 210 the discriminator and numeral 211 an output terminal thereof. When signals are applied to the input terminals 201 and 202, a voltage change proportional to the difference between the input signals appears at the output terminals 204 and 205, with the result that the electric potential of one of the output terminals 204 and 205 becomes higher than the other depending on which input terminal 201 or 202 has a higher potential. When the higher potential at the output terminal 204 or 205 exceeds a predetermined level, current flows in the load resistor 208 through the diode 206 or 207 with a voltage appearing at the input terminal of the discriminator 210. This voltage is discriminated by the discriminator 210 thereby to detect the error in the primary discrimination, sending the resulting pulse to the terminal 211.

Referring to FIG. 11, the reference numerals 301 and 302 show input terminals of the differential amplifier 303 and the numerals 304 and 305 output terminals thereof. The outputs of the differential amplifier 303 are discriminated separately by the two discriminators 306 and 307 respectively and the pulses delivered from the discriminators 306 and 307 are combined by the OR circuit 308 to produce a pulse at the output terminal 309, so that a pulse is produced even when one of the electric potentials of the outputs of the differential amplifier is higher than the other.

In FIG. 12, the reference numerals 401 and 402 show input terminals of the differential amplifier 403, numerals 404 and 405 output terminals thereof, numerals 406 and 407 discriminators, numeral 408 an input terminal of the shift register 409, numeral 410 an output terminal thereof, numeral 411 a NOT output terminal of the shift register, numerals 412, 413 and 414 NAND gates, and numeral 415 an output terminal of the NAND gate 414. As in the case of FIG. 11, the outputs of the differential amplifier 403 are discriminated by the two discriminators 406 and 407 respectively, while the output of the discriminator 406 and the output 410 of the shift register are applied to the NAND gate 412 for NAND operation. On the other hand, the output of the discriminator 407 and the NOT output of the shift register 409 are applied to the NAND gate 413 also for NAND operation. The NAND operation of the NAND gate 414 between the outputs of the NAND gates 412 and 413 prevents the pulses produced by the discriminators 406 and 407 from being produced at the output terminal 415 so that the pulse from the secondary discriminator, if any, is prevented from being half-added to the pulse train derived from the first discriminator when a positive receiving signal is superimposed with a positive noise or a large negative noise, or a negative receiving signal is superimposed with a negative nosie or a large positive noise.

Figure 2:
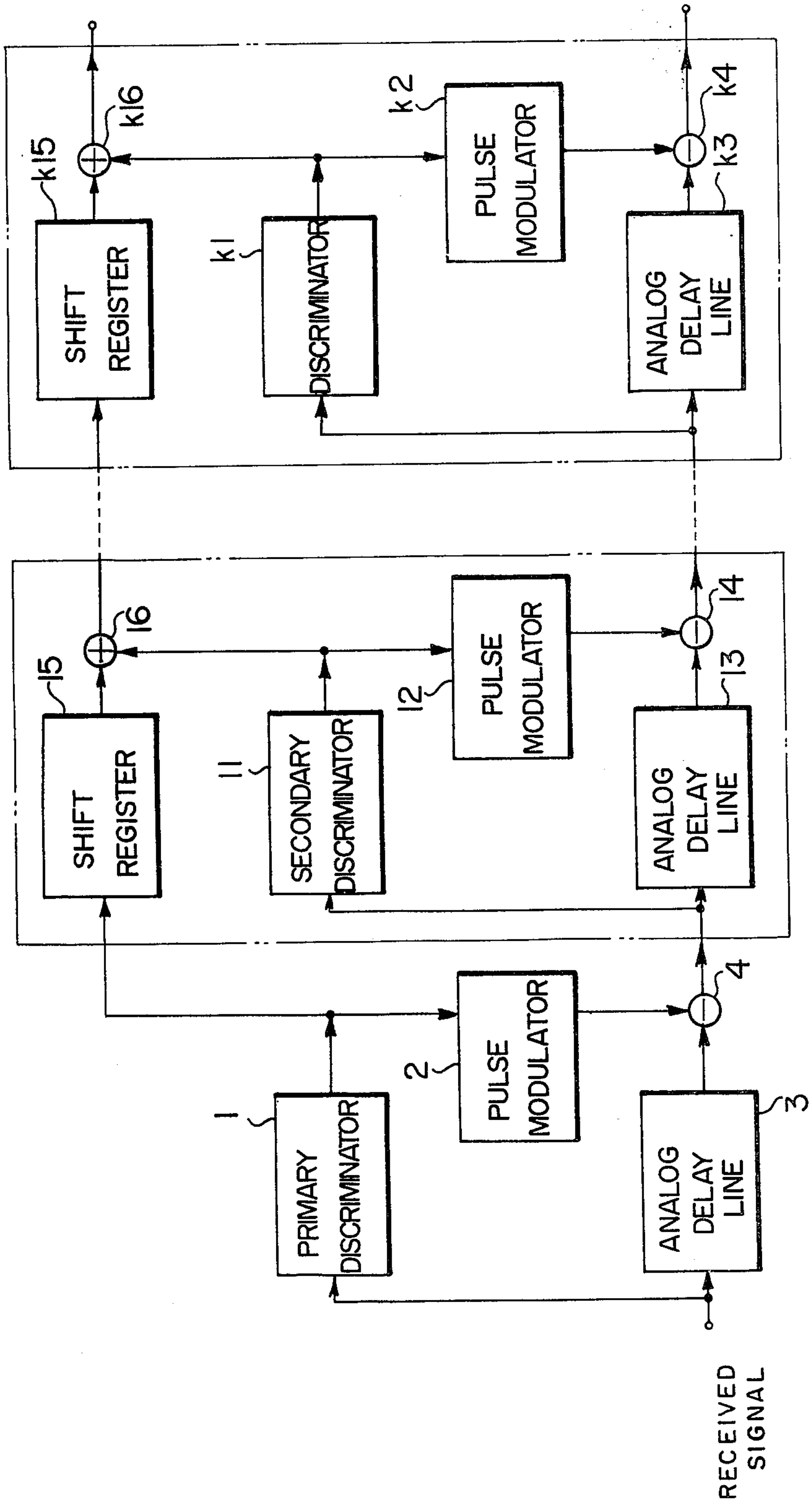
FIG. 2 is a schematic block diagram showing k stages of the system according to the present invention connected in cascade.

Although the above-mentioned embodiments involve only a signal stage of secondary discrimination, multiple stages may be employed therefor if the conding error rate is to be further reduced. For this purpose, by providing multiple stages of the secondary discrimination-correction circuits 11 to 19 as shown in FIG. 2 connected in cascade, the coding errors $\eta_1, \eta_2, \ldots \eta_{k+1}$ of digital information output of each stage become progressively lower to any desired extent as may be noted by the expression $\eta_1 > \eta_2 > \ldots > \eta_{k+1}$.

What we claim is:

1. A method of eliminating error of discrimination due to intersymbol interference comprising steps of primarily discriminating an input signal to provide a discriminated pulse train, digitally delaying said discriminated pulse train by means of a shift register comprising at least two flip-flops, weighting an output or NOT output of each of said flip-flops, analogically adding said weighted signals to each other, analogically delaying said input signal, comparing the output produced in said step of analogical delay with the output produced in said step of analogical addition, secondarily discriminating the result of said comparison by reference to a threshold value, generating a pulse corresponding to the result of said secondary discrimination, digitally half-adding said pulse to the output of said shift register, shaping said pulse corresponding to the result of said secondary discrimination into a waveform corresponding to the waveform of the input signal, analogically delaying the output produced in said step of comparison, and comparing said pulse of the corresponding waveform with said analogically delayed signal derived from said signal produced in said step of comparison.

2. A device for eliminating errors of discrimination due to intersymbol interference comprising means for discriminating input signals, means for digitally delaying a train of pulses obtained by said discriminating means, means for analogically delaying said input signals, means for changing to a predetermined level the amplitude of each pulse of said pulse train, means for comparing said analogically delayed input signals with said signal having the predetermined amplitude, means for discriminating the output of said comparing means with reference to a predetermined threshold value, means for generating a pulse corresponding to the output of said discriminating means, means for digitally half-adding said pulse to the output of said digitally delaying means, means for shaping the pulse generated by said last-mentioned discriminating means into a waveform corresponding to the waveform of the input signals, means for analogically delaying the output signal of said comparator means, and means for comparing said signal of the corresponding waveform with said analogically delayed output signal.

3. A method of eliminating errors of discrimination due to intersymbol interference comprising the steps of first discriminating input signals, digitally delaying a train of pulses obtained by said first discrimination, analogically delaying said input signals, changing to a predetermined level the amplitude of each pulse of said pulse train obtained as the result of said first discrimination of said input signals, comparing said analogically delayed input signals with said signal having said predetermined amplitude, second discriminating the result of said comparison with reference to a predetermined threshold value, generating a pulse corresponding to the result of second discrimination, digitally half-adding said pulse to the output produced in said step of digital delay, analogically delaying the output signal of said comparison, shaping the pulse generated as the result of said second discrimination into a waveform corresponding to the waveform of the input signals, and comparing said signal of the corresponding waveform with said analogically delayed signal of said comparison.

4. A method according to claim 3, wherein the step of changing to a predetermined level the amplitude of each of a train of pulses obtained as the result of first discrimination of input pulses includes applying the input signals to a filter, the filter including at least one of a coil, a capacitor and a resistor.

5. A method according to claim 3, wherein the step of comparing the analogically delayed input signals with the signal with the predetermined amplitude includes applying said signals to a differential amplifier with mutually complementary output terminals, in which the two outputs of said differential amplifier are full-wave rectified and the rectified output is discriminated by the second discrimination.

6. A method according to claim 3, in which said step of generating a pulse corresponding to the result of said second discrimination comprises steps of obtaining two outputs from a differential amplifier used for said step of comparing and having two mutually complementary output terminals, discriminating separately with a pair of discriminator means the two outputs of the differential amplifier, generating a pulse corresponding to each output of said discriminator means, and applying said pulse through an OR gate.

7. A method according to claim 3, in which said step of generating a pulse corresponding to the result of the second discrimination comprises steps of obtaining two outputs from a differential amplifier used for step of comparing and having two mutually complementary output terminals, discriminating separately with a pair of discriminator means the two outputs of the differential amplifier, generating a pulse corresponding to each output of said discriminator means, applying to a first NAND gate the output produced in said step of digital delay and one of the outputs produced in said step of pulse generation, applying to a second NAND gate the other of the outputs produced in said step of pulse generation and a NOT output produced in said step of digital delay, and applying to a third NAND gate the outputs of said first and second NAND gates.

8. A method of eliminating errors of discrimination due to intersymbol interference comprising the steps of discriminating an input signal with respect to a first predetermined threshold value thereby to produce a train of pulses, analogically delaying said input signal, digitally delaying said train of pulses, producing a first analog signal corresponding to the waveform of said input signal from said train of pulses, comparing said analogically delayed input signal with said first analog signal thereby to produce a difference signal indicative of the difference therebetween, discriminating said difference signal with respect to a second predetermined threshold value thereby to produce a pulse signal, and digitally half-adding said pulse signal to said digitally delayed train of pulses to provide a corrected train of pulses.

9. A method according to claim 8, further comprising the step of counting the number of pulse signals of the last-mentioned discrimination over a predetermined period as an indication of the discrimination error rate.

10. A method according to claim 8, further comprising the steps of producing a second analog signal from said pulse signal obtained by the last-mentioned discrimination, analogically delaying the analogically delayed input signal, and comparing the twice analogically delayed input signal with the second analog signal.

11. A method according to claim 8, further comprising the steps of producing a second analog signal from said pulse signal obtained by the lastmentioned discrimination, analogically delaying said difference signal, and comparing said analogically delayed difference signal with said second analog signal to provide an output signal indicative of the discrimination error rate.

12. A method according to claim 9, wherein the step of producing the first analog signal includes applying the train of pulses to a filter, the filter including at least one of a coil, a capacitor and a resistor.

13. A method according to claim 11, wherein the step of comparing said analogically delayed input signal with said first analog signal is carried out by applying the signals to a differential amplifier with mutually complementary output terminals, in which the two outputs of said differential amplifier are full-wave rectified and the rectified output is discriminated by the second discriminator.

14. A method according to claim 11, wherein a second difference signal which is complementary of said first-mentioned difference signal is produced by comparing said analogically delayed signal with said first analog signal, said first and second difference signals being independently subject to respective discriminations with respect to the second predetermined threshold value and then the outputs derived from said respective discriminations are applied to an OR gate thereby to produce said pulse signal.

15. A method according to claim 11, wherein a second difference signal which is complementary of said first-mentioned difference signal is produced by comparing said analogically delayed signal with said first analog signal, said first and second difference signals being independently subject to respective discriminations with respect to the second predetermined threshold value, one of the outputs derived from said respective discriminations is applied to a first NAND circuit to which the digitally delayed pulse signal is also applied, and the other of said outputs is applied to a second NAND circuit to which a NOT output of said digitally delayed pulse signal is also applied, and the outputs of said first and second NAND circuits are applied to a third NAND circuit thereby to produce a pulse signal representing the result of the discrimination with respect to the second threshold value.

* * * * *